United States Patent
Wang

(10) Patent No.: US 7,058,416 B2
(45) Date of Patent: Jun. 6, 2006

(54) TRAFFIC CHANNEL ALLOCATING METHOD IN GSM MOBILE COMMUNICATION

(75) Inventor: Xu Wang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/503,361

(22) PCT Filed: Jan. 30, 2003

(86) PCT No.: PCT/CN03/00105

§ 371 (c)(1),
(2), (4) Date: Nov. 5, 2004

(87) PCT Pub. No.: WO03/069923

PCT Pub. Date: Aug. 21, 2003

(65) Prior Publication Data

US 2005/0059403 A1 Mar. 17, 2005

(30) Foreign Application Priority Data

Feb. 9, 2002 (CN) .............................. 02110833 A

(51) Int. Cl.
*H04Q 7/20* (2006.01)

(52) U.S. Cl. ...................... 455/464; 455/450; 455/509; 455/515

(58) Field of Classification Search ................ 455/466, 455/443, 452.1, 446, 447, 448, 450, 67.11, 455/464, 509, 550
See application file for complete search history.

(56) References Cited

U.S. PATENT DOCUMENTS 5,448,751 A * 9/1995 Takenaka et al. ............ 455/450
5,758,090 A 5/1998 Doner ......................... 395/200

OTHER PUBLICATIONS

Qing hua Wu, et al., "Introduction of GSM Concentric Annular Ring Technology", Hu Bei Post & Telecommunications Technology, Issue 3, Sep. 1998.

* cited by examiner

*Primary Examiner*—Sonny Trinh
*Assistant Examiner*—Dung Lam
(74) *Attorney, Agent, or Firm*—Baker & Hostetler LLP

(57) ABSTRACT

The present invention relates to a method for allocating a traffic channel in a concentric cell. Said method comprises the following steps: establishing a SDCCH (Stand-alone Dedicated Control Channel) between the base station and the mobile station; the base station receiving a plurality of measured reports sent from the mobile station; the base station obtaining measured the up-link level values of SDCCH according to said measured reports; the base station determining the distance between itself and the mobile station according to said measured up-link level values. The method for allocating a TCH according to the present invention can allocate reasonable carrier frequencies for calls quickly and effectively, thus can improve the performance of the mobile communication system greatly.

9 Claims, 3 Drawing Sheets

TRAFFIC CHANNEL ALLOCATING METHOD IN GSM MOBILE COMMUNICATION

FIELD OF THE INVENTION

The present invention relates to GSM mobile communication, particularly to a method for allocating a traffic channel (TCH) in GSM mobile communication.

BACKGROUND OF THE INVENTION

GSM mobile communication systems have the largest user base in the world; however, with the number of users increases continuously, the frequency resource becomes tight increasingly. To reduce frequency interference and improve traffic quality across the entire GSM network, mobile communication equipment manufacturers have introduced application solutions based on concentric cell technology in succession. FIG. 1 is a diagram of a concentric cell. As shown in FIG. 1, the cell is divided into two coverage zones (Overlaid subcell 2 and Underlaid subcell 3) according to the distance to the center (i.e., the base station 1) of the cell. Different carrier frequencies are allocated to the coverage zones 2 and 3 in consideration of strong uplink and downlink power and strong anti-interference ability near the base station 1, herein, frequencies or channels sensitive to interferences are allocated to Overlaid subcell 2, whereas frequencies or channels insensitive to interferences are allocated to Underlaid subcell 3. If the mobile station is in Underlaid subcell 3 (i.e., the mobile station is far from the base station 1), it will occupy a carrier frequency of the Underlaid subcell 3; if it is in Overlaid subcell 2 (i.e., the mobile station is near the base station 1), it will occupy a carrier frequency of the Overlaid subcell 2 first, however, if all of the channels of Overlaid subcell 2 are occupied, it will occupy a channel of the Underlaid subcell 3.

Because concentric cell technology achieves optimal combination of inner and underlaid subcells for all frequencies in the cell and even all frequencies across the entire network, it is helpful to reduce frequency interference and enhance frequency multiplexing.

In order to allocate carrier frequency resource reasonably and quickly for a voice call, the base station 1 usually allocates a carrier frequency of Underlaid subcell to the TCH first, and then switches the call to a carrier frequency of overlaid subcell or keeps it at the current carrier frequency according to the values of the measured reports in the TCH. The measured reports contain measured up-link level values and measured down-link level values, which are measured by the base station 1 and the mobile station for the up-link channel and the down-link channel, respectively; each measured level value comprises up-link (down-link) signal intensity, up-link (down-link) signal quality and timing advance.

In concentric cell technology, the carrier frequency resource of Overlaid subcell is usually used for telephone traffic; whereas the carrier frequency resource of Underlaid subcell is used to expand the coverage as much as possible, i.e., most calls should be allocated with channels of Overlaid subcell. However, in the conventional application solution, as shown above, calls are allocated to channels of Underlaid subcell first, and then they are switched to channels of Overlaid subcell or kept at channels of Underlaid subcell according to the values of measured reports in the TCH, thus the solution will result in unnecessary switching operations; in addition, because the calls always stay at channels of Underlaid subcell for some time first, the probability of channel congestion in the Underlaid subcell will increase.

SUMMARY OF THE INVENTION

It is the object of the present invention to provide a method for allocating a TCH in a concentric cell, which can allocate reasonable carrier frequencies for calls quickly and effectively, thereby improve performance of the mobile communication system greatly.

In the method for allocating a TCH in a concentric cell according to the present invention, the concentric cell is divided into an overlaid subcell and an underlaid subcell, each of which occupies its own carrier frequency; said method comprises the following steps: establishing a SDCCH (Stand-alone Dedicated Control Channel) between the base station and the mobile station; the base station receiving a plurality of measured reports sent from the mobile station; the base station obtaining measured the up-link level values of SDCCH according to the measured reports; the base station determining the distance between itself and the mobile station according to said measured up-link level values; if the distance is relatively long, the base station allocating a TCH at a carrier frequency of the underlaid subcell for the mobile station; otherwise it allocating a TCH at a carrier frequency of the overlaid subcell.

Since the SDCCH is established before the TCH is allocated, compared with the prior art, the method according to the present invention can determine the distance between the mobile station and the base station more quickly and thereby directly leads the call to a carrier frequency of the overlaid subcell or a carrier frequency of the underlaid subcell, so that the number of switching operations are reduced, and the performance of the entire mobile communication system is enhanced.

DETAILED DESCRIPTION OF THE EMBODIMENTS

Figure 1:
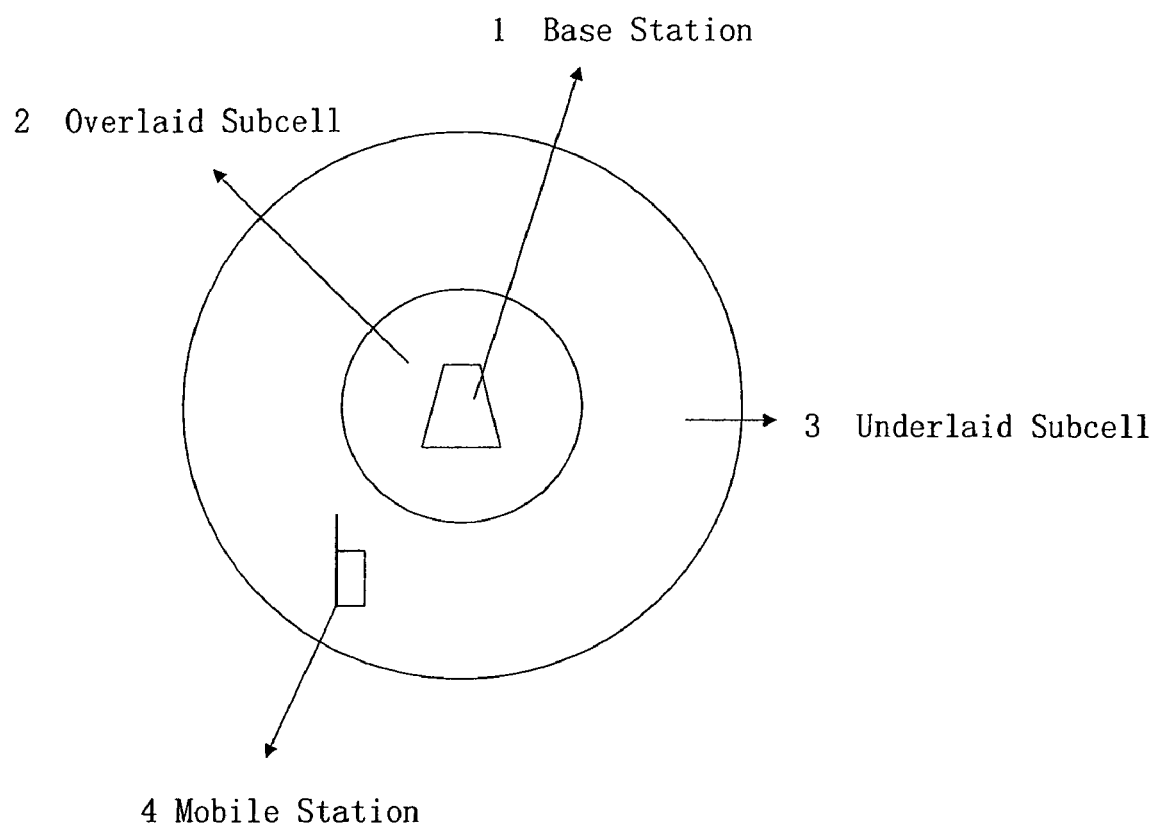
FIG. 1 is a schematic diagram of a concentric cell in GSM communication system.

Hereunder the call setup process in the GSM system is described with reference to FIG. 1. As shown in FIG. 1, when the mobile station 4 initiates a call, a SDCCH necessary for signaling interaction for call setup is established between the base station 1 and the mobile station 4; the base station 1 allocates and establishes a TCH for the mobile station 4 initiating the call to transfer voice through signaling interaction; after the TCH is established, the user can perform call on the TCH; and then the system releases the SDCCH. The SDCCH is a duplex one, and usually, the channel from mobile station 4 to base station 1 is defined as the up-link channel; whereas the channel from base station 1 to mobile station 4 is defined as the down-link channel.

The mobile station 4 will send measured reports to the base station 1, after the SDCCH channel is established and before the base station 1 sends a TCH-activating command. Each of the measured reports contains measured up-link level value and measured down-link level value, which indicates the distance from the mobile station 4 to the base station 1; the shorter the distance is, the higher the measured level value is; on the contrary, the longer the distance is, the lower the level measured value is.

According to statistical analysis of traffic data, only about 50% of the telephone traffic can provide accurate measured down-link level values of SDCCH after the SDCCH channel is established and before the base station sending the TCH-activating command during the TCH allocation, whereas about 96% of the telephone traffic can provide accurate measured up-link level values of SDCCH before the base station sending the TCH-activating command.

The mobile station provides at least two measured reports before the TCH is activated (i.e., before TCH allocation) during all calls setup process, and the mobile station even provides three or more measured reports before the TCH is activated during about 70% of the calls setup process; wherein the accuracy of the first measured report is very low (only 15%), the accuracy of the second measured report is higher than 88% (as for the measured up-link level values), the third measured report, about 96% (as for the measured up-link level values). In general, the overall reliability of allocating TCH according to the measured up-link level values of SDCCH is about 94%. Therefore, it is feasible to determine the distance from the mobile station to the base station and then allocate the TCH according to the measured up-link level value of SDCCH in the measured report.

Besides accuracy factor, the reason for not allocating TCH according to the measured down-link level value of SDCCH in the measured report also lies in the long time delay of the measured down-link level value owing that the measured down-link level value is measured and provide by the mobile station; such time delay will result in delay in TCH allocation and degradation of system performance.

In addition, since the measured up-link level values are indirect ones, the compensation for difference between the up-link levels and the down-link levels and difference between the measured values of SDCCH and those of TCH should be taken into consideration in channel allocation. Thus, Two parameters Lcomp and Dcomp are introduced, wherein Lcomp (compensation for balance of up-link and down-link) may be obtained by taking statistics for the difference between the up-link levels and down-link levels in the measured reports, whereas Dcomp (compensation for difference between SDCCH and TCH) may be obtained by taking statistics for the difference between level values of SDCCH and TCH in the measured reports. When said two parameters are introduced, the measured up-link level value MS_Rxlev_com(n) is:

$$MS\_Rxlev\_com(n) = MS\_Rxlev(n) + Lcomp + Dcomp \quad (1)$$

Wherein MS_Rxlev(n) is the measured up-link level value obtained directly from the nth measured report.

Figure 2:
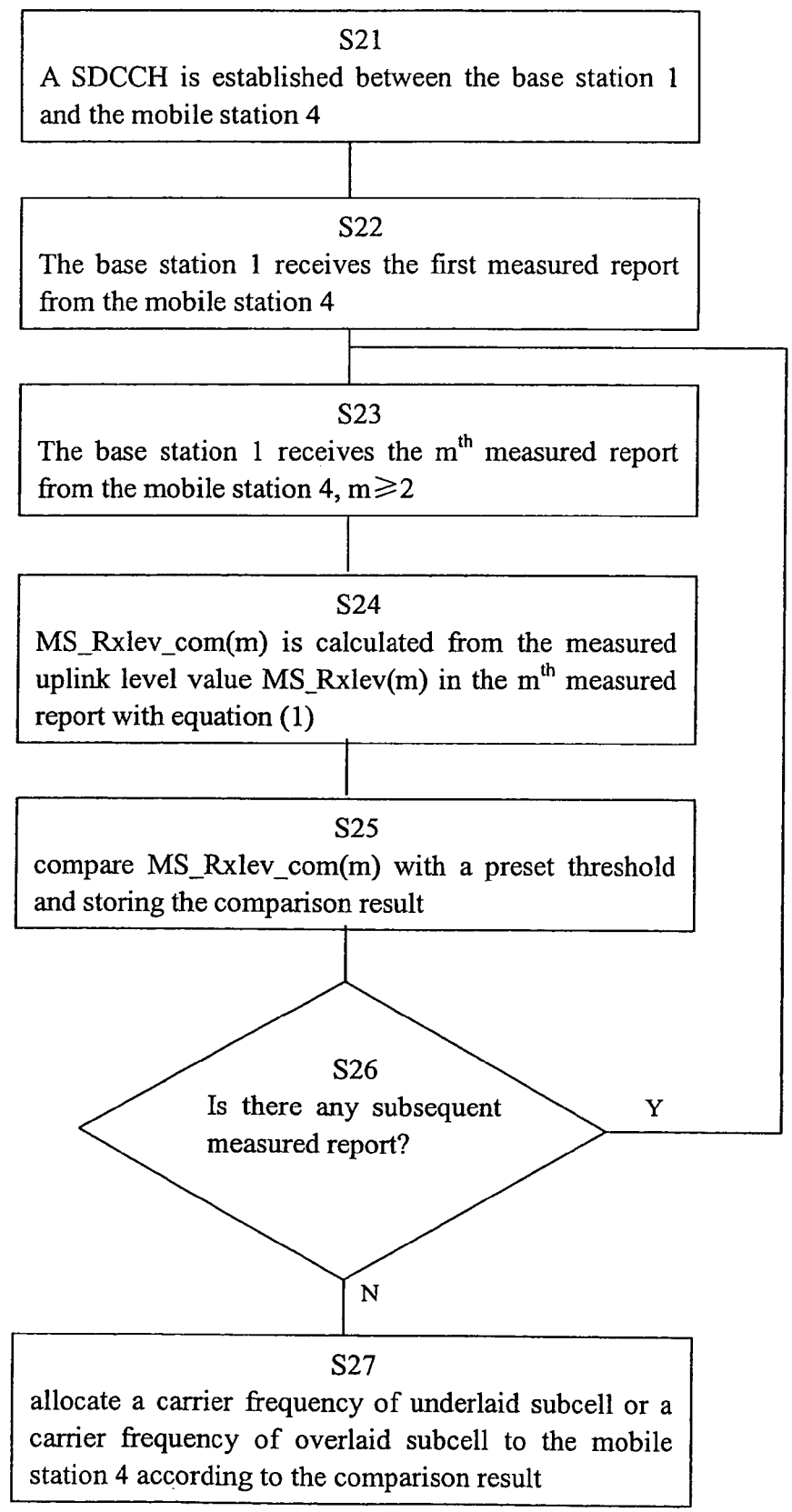
FIG. 2 is a flow chart of the method for allocating a TCH according to an preferred embodiment of the present invention.

Hereunder a preferred embodiment of the present invention is described with reference to FIG. 2. As shown in FIG. 2, in step S21, a SDCCH is established between the base station 1 and the mobile station 4, and the base station 1 is ready to receive measured reports from the mobile station 4; each of the measured reports contains measured up-link level value MS_Rxlev(n) of SDCCH, wherein n is serial number of the measured reports and starts from 1; in step S22, the base station 1 receives the first measured report; as described above, the accuracy of the first measured report is low, therefore the base station 1 waits for subsequent measured reports after that; when the base station 1 receives the $m^{th}$ ($m \geq 2$) measured report, the process goes to step S23; next, in step 24, with above equation (1), the base station 1 calculates MS_Rxlev_com(m) from MS_Rxlev(m); then in step 25, the base station 1 compares the obtained MS_Rxlev_com(m) with a preset threshold and stores the comparison result; then instep S26, if the mobile station 4 sends any new measured report before the base station 1 sends a TCH activation command, the process returns to step S23, the base station obtains a new comparison result in the same way and replaces the existing comparison result with the new one, otherwise the process goes to step S27; in step S27, the base station 1 determines whether to allocate a carrier frequency of underlaid subcell or to allocate a carrier frequency of overlaid subcell to the mobile station 4 according to the latest comparison result, i.e., if the comparison result is larger than or equal to the threshold, it indicates the measured up-link level value is higher, then the base station 1 will allocate a carrier frequency of overlaid subcell to the mobile station 4; if the comparison result is less than the threshold, it indicates the measured up-link level value is lower, then the base station 1 will allocate a carrier frequency of underlaid subcell to the mobile station 4.

Figure 3:
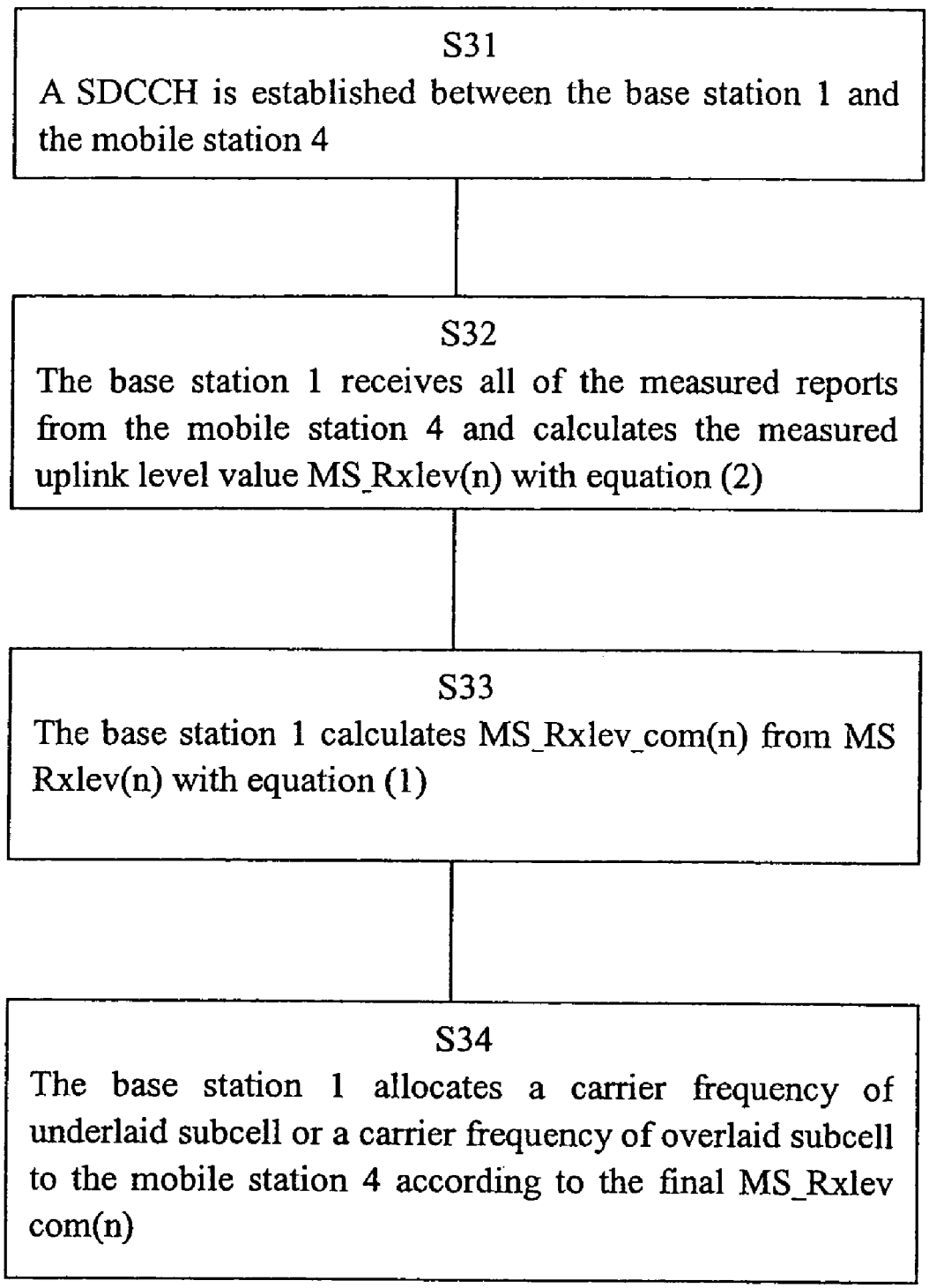
FIG. 3 is a flow chart of the method for allocating a TCH according to another preferred embodiment of the present invention.

Hereunder another preferred embodiment of the present invention is described with reference to FIG. 3. In this case, in view of the correlation between measured up-link level values in different measured reports, a predict filtering algorithm is used to obtain the final measured up-link level value for TCH allocation. As shown in FIG. 3, in step S31, a SDCCH is established between the base station 1 and the mobile station 4; in step S32, the base station 1 receives all of the measured reports from the mobile station 4 and then calculates the measured up-link level value MS_Rxlev(n), wherein n is serial number of measured reports with the following equation:

$$MS\_Rxlev(n) = a \times MS\_Rxlev(n) + (1-a)MS\_Rxlev(n-1) \quad (2)$$

Wherein MS_Rxlev(n) is up-link level in the current measured report, MS_Rxlev (n–1) is up-link level in the previous measured report (assume MS_Rxlev(0)=0), a is the weight of the measured value and ranges from 0.6 to 1.

In step S33, the base station 1 calculates MS_Rxlev_com (n) from MS_Rxlev(n) with above equation (1);

In step S34, the base station 1 determines whether to allocate a carrier frequency of underlaid subcell or allocate a carrier frequency of overlaid subcell to the mobile station 4 according to the final MS_Rxlev_com(n), i.e., if the comparison result is larger than or equal to the threshold, it indicates the measured up-link level value is higher, and then the base station 1 will allocate a carrier frequency of overlaid subcell to the mobile station 4; if the comparison result is less than the threshold, it indicates the measured up-link level value is lower, and then the base station 1 will allocate a carrier frequency of underlaid subcell to the mobile station 4.

Compared with the prior art in which the base station allocates a TCH channel of underlaid subcell to the mobile station first and then changes it through switching), a method for allocating a TCH according to the present invention reduces the number of switching operations greatly, increases channel allocation speed, and alleviates congestion of channels of underlaid subcell; therefore, it reduces call drop caused by switching and thus enhances performance of the entire system.

The invention claimed is:

1. A method for allocating a TCH (traffic channel) to a mobile station in a concentric cell centered around a base station, the concentric cell is divided into an inner overlaid subcell and an outer underlaid subcell, each of which occupies its own carrier frequency, wherein said method comprises the following steps:
   1) establishing a SDCCH (Stand-alone Dedicated Control Channel) between the base station and the mobile station;
   2) the base station (1) receiving a plurality of measured down-link level values sent from the mobile station, and combining one of a plurality of up-link level values measured by the base station with corresponding one of the plurality of down-link level values measured by the mobile station to form a plurality of measured reports;
   3) the base station (1) processing the measured up-link level values obtained directly from the plurality of measured reports with the following equation (1) so as to obtain measured up-link level values of SDCCH;

$$MS\_Rxlev\_com(n)=MS\_Rxlev(n)+Lcomp+Dcomp \qquad (1)$$

wherein MS_Rxlev(n) is the measured up-link level value obtained directly from the $n^{th}$ measured report, MS_Rxlev_com(n) is the processed measured up-link level value, Lcomp is compensation for balance of up-link and down-link, Dcomp is compensation for the difference between SDCCH and TCH, and n is the serial number of the measured reports and $n \geq 2$; and
   4) the base station (1) determining the distance between itself and the mobile station according to said measured up-link level values MS_Rxlev_com(n); if the distance is relatively long, the base station allocating a TCH at a carrier frequency of the outer underlaid subcell for the mobile station, otherwise allocating a TCH at a carrier frequency of the inner overlaid subcell.

2. The method of claim 1, further comprising the following steps:
   said base station (1) comparing the processed MS_Rxlev_com(n) with a preset threshold and then storing the comparison result for the determination of the distance between itself and the mobile station; and
   if the mobile station (4) sends any new measured report before the base station (1) sends a TCH activation command, the process returns to step 3) of claim 1, otherwise the process goes to step 4) of claim 1.

3. The method of claim 1, wherein further comprising the following step:
   before the processing with equation (1), the base station (1) recalculating the measured up-link level values obtained directly from the plurality of measured reports with the following equation (2):

$$MS\_Rxlev(n)=a \times MX\_Rxlev(n)+(1-a)MS\_Rxlev(n-1) \qquad (2)$$

wherein MX_Rxlev(n−1) is the up-link level in the previous measured report, assume MS_Rxlev(0)=0, and a is the weight of the measured value and ranges from 0.6 to 1.

4. The method of claim 1, wherein Lcomp is obtained by taking statistics for the difference between the up-link levels and down-link levels in the measured reports.

5. The method of claim 1, wherein Dcomp is obtained by taking statistics for the difference between level values of SDCCH and TCH in the measured reports.

6. The method of claim 2, wherein Lcomp is obtained by taking statistics for the difference between the up-link levels and down-link levels in the measured reports.

7. The method of claim 2, wherein Dcomp is obtained by taking statistics for the difference between level values of SDCCH and TCH in the measured reports.

8. The method of claim 3, wherein Lcomp is obtained by taking statistics for the difference between the up-link levels and down-link levels in the measured reports.

9. The method of claim 3, wherein Dcomp is obtained by taking statistics for the difference between level values of SDCCH and TCH in the measured reports.

* * * * *